No. 620,033. Patented Feb. 21, 1899.
W. J. HAWKINS & R. H. WRIGHT.
MEANS FOR ADVERTISING.
(Application filed July 23, 1898.)
(No Model.)
Fig. 1.
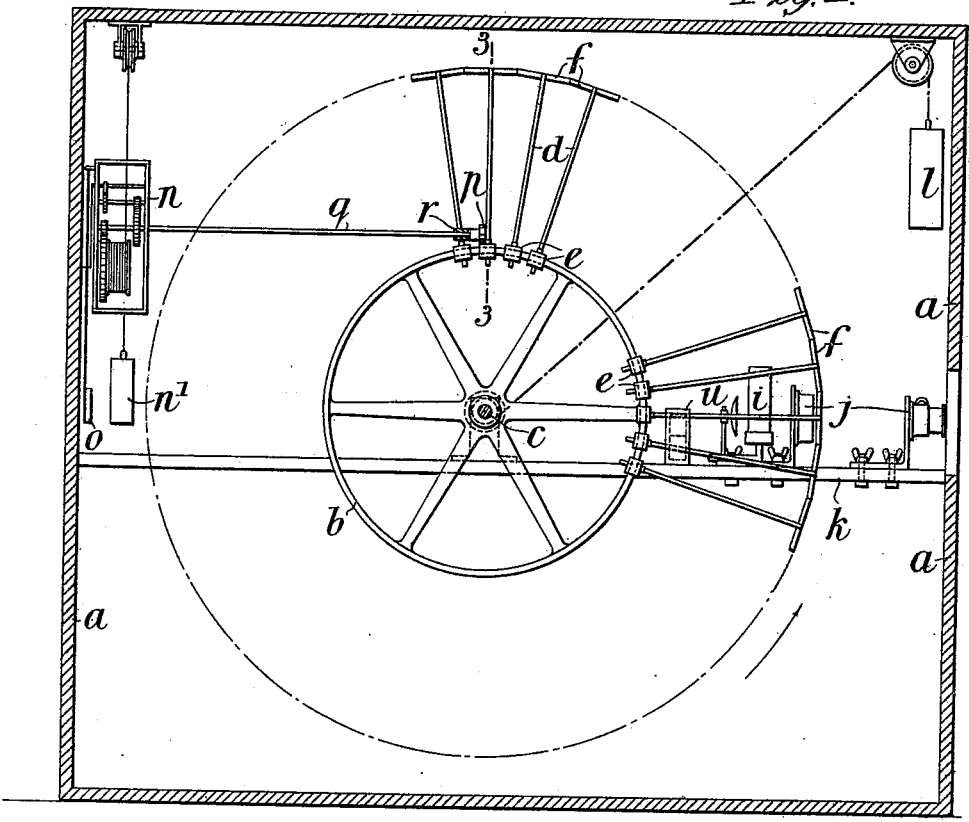
Fig. 2.
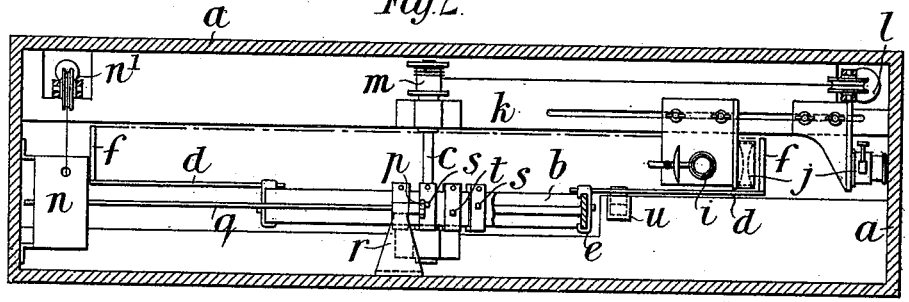
Fig. 3. Fig. 4. Fig. 5.
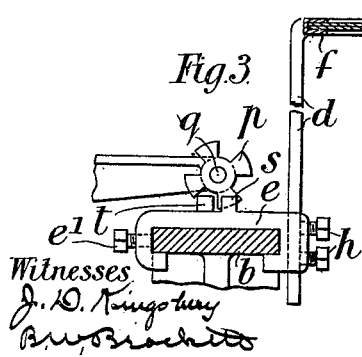
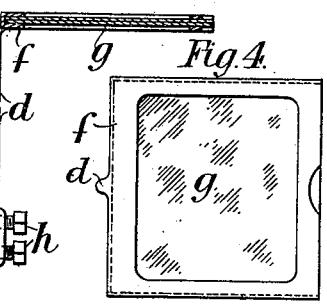
Witnesses
J. D. Kingsbury
B. W. Brackett
Inventors
William J. Hawkins
Reginald H. Wright
by Whitaker & Prevost attys.
THE NORRIS PETERS CO., PHOTO-LITHO., WASHINGTON, D. C.

UNITED STATES PATENT OFFICE.

WILLIAM JOHN HAWKINS AND REGINALD HARCOURT WRIGHT, OF PARTINGTON, ENGLAND.

MEANS FOR ADVERTISING.

SPECIFICATION forming part of Letters Patent No. 620,033, dated February 21, 1899.

Application filed July 23, 1898. Serial No. 686,706. (No model.)

*To all whom it may concern:*

Be it known that we, WILLIAM JOHN HAWKINS and REGINALD HARCOURT WRIGHT, subjects of the Queen of Great Britain, residing at Partington, in the county of Chester, England, have invented a new and useful Improved Means for Advertising, (for which we have applied for a patent in Great Britain, No. 27,601, dated November 24, 1897,) of which the following is a specification.

Our invention relates to advertising apparatus of that kind wherein a series of lantern-slides or transparencies is mounted upon a wheel adapted to be intermittently rotated and arranged in conjunction with a projecting lantern in such a manner that as the slides are successively brought into focus a picture or other advertisement will be projected onto a screen, sheet, or other surface. Apparatus of this kind as heretofore constructed is defective and mainly for the reason that no efficient means are provided for accurately bringing the slides into focus. The chief object of our invention is to overcome this difficulty, and to this end the slides are mounted in frames carried by arms upon a wheel, which arms are independently adjustable, so as to permit of focusing the slides individually.

Our invention also comprises an escapement in the form of a star-wheel which is operated by clock mechanism in such a manner that at predetermined intervals the wheel is allowed to rotate under the action of a suitable motor and a brake for steadying the movement of the apparatus during the time that it is being rotated by the motor, so as to prevent the jarring or shaking which would otherwise be produced when the wheel is brought to rest.

To enable our invention to be fully understood, we will describe the same by reference to the accompanying drawings, in which—

Figure 1 is a sectional side elevation of apparatus constructed according to our invention. Fig. 2 is a sectional plan of the same. Fig. 3 is a section on the line 3 3, Fig. 1, but drawn to a larger scale, illustrating the arrangement of one of the arms carrying a slide and also the means which we employ for causing the intermittent rotation of the wheel. Fig. 4 is a plan view of the slide-holder of one of the arms, drawn to the same scale as Fig. 3; and Fig. 5 is a side elevation of a brake which we use for steadying the motion of the apparatus, the said figure being drawn to a larger scale than Figs. 1 and 2.

$a$ is the box or framing in which the apparatus is mounted.

$b$ is the wheel, carried in suitable bearings upon the shaft or spindle $c$, and $d\,d$ are the arms for carrying the lantern-slides, the said arms at their inner ends being carried in clips $e\,e$, adjustable upon the rim of the wheel $b$ and fixed thereon by set-screws $e'$. The arms $d\,d$ are provided at their outer ends with frames $f\,f$, in which the lantern-slides (one of which is indicated by the letter $g$ in Figs. 3 and 4) are mounted. The arms $d\,d$ are not fixed to the clips $e\,e$, but are made to slide therein in the radial direction of the wheel, set-screws $h\,h$ or the like being provided for securing the said arms in any position. With this arrangement it will be understood that the arms $d\,d$ can be arranged nearer together or farther apart, according to the number of slides which the wheel is to carry, so that the said wheel may be balanced, and that the frame for carrying each slide is radially adjustable toward or away from the axis of the wheel $b$.

$i$ is a lamp or other apparatus for illuminating the slides, and $j\,j$ are the usual lenses, the said lamp and lenses being adjustable upon the plate or bar $k$ of the framing. It will be noticed by reference to Fig. 2 that the said lamp and lenses project laterally from the said bar $k$ and that the frames $f\,f$ of the arms $d$ also project laterally, so as to pass in front of the lamp.

$l$ is a weight which serves as a motor for rotating the wheel, the said weight being connected to one end of a cord, the other end of which is coiled around a drum or pulley $m$ on the shaft $c$ of the wheel $b$ in such a manner that the said weight will rotate the wheel in the direction of the arrow, Fig. 1.

$n$ is a clock mechanism which, as shown, is also operated by a weight, (indicated at $n'$,) the movement of the said clock being controlled by a pendulum $o$.

$p$ is our star-wheel escapement which serves to control the intermittent motion of the wheel *b* and which is mounted upon the outer end of a spindle *q*, which forms an extension of the arbor of one of the clock-wheels, the said outer end of the spindle *q* being carried in a bearing or bracket *r*. This star-wheel *p*, which is clearly shown in Fig. 3, is designed to coöperate with cogs *s t* upon the clips *e e*, the cogs *s* being arranged in a different plane from the cogs *t* on the alternate clips. With this arrangement it will be understood that as the star-wheel *p* is rotated by the clock mechanism *n* the cogs *s t* will be alternately engaged with and released by the said star-wheel—that is to say, one of the cogs, say the cog *s*, will by bearing against one of the teeth of the star *p* retain the wheel *b* stationary against the action of the weight *l* until such time as the said tooth has moved out of the path of the cog *s*, the wheel *b* being then rotated until it is arrested by the next following tooth of the star-wheel *p*, which during the time that the first-mentioned tooth of the star-wheel *p* was passing the cog *s* and moving out of its path was entering the path of the next cog *t*, and so on. In practice a uniform distance must be maintained between the cogs, so that each time the wheel *b* is released by the escapement it will move a sufficient distance to bring the slide next to that which was previously exhibited into focus.

It will be obvious that the sudden stoppage of the wheel *b*, together with the arms and slides carried thereby, by the successive impingement of the cogs *s t* against the star-wheel would produce an amount of vibration which might considerably impair the efficiency of the apparatus owing to the possible derangement or shaking of the slides in their frames. In order, therefore, to prevent such jar, we make use of a brake arrangement for steadying the motion of the wheel. The form of brake which we have found to give good results and which is indicated by the letter *u* in Figs. 1 and 2 and which is shown drawn to an enlarged scale in Fig. 5 comprises a recessed pillar *v*, in which is pivoted a block *w*, acted upon by a spring *x*, which normally tends to cause the said block to project beyond the face of the pillar to form an inclined surface, against which the arms *d d* as the wheel rotates will impinge, the resistance which the backward movement of the block *w* under the action of the arms *d* and against the pressure of the spring *x* offers serving to give the required check to the rotation of the wheel. It will be understood that the position of the said brake and the strength of the spring *x* must be such that the wheel is practically brought to rest just at the moment that the cog which is to retain the wheel comes in contact with the star-wheel *p*. By the time this has taken place the arm *d* of the slide being exhibited should just have passed the extremity of the block *w*, so that the latter will have sprung outward, as indicated in Fig. 5, and support the said arm during the time that the slide which it carries is being exhibited.

We find it advantageous to place upon the top of the block *w* a pad *y* of india-rubber.

The length of time during which a slide is being exhibited will depend upon the rate at which the star is rotated and which of course is dependent upon the clock mechanism.

Having now particularly described and ascertained the nature of our said invention and in what manner the same is to be performed, we declare that what we claim is—

1. In an advertising device the herein-described carrier comprising among its members, a wheel mounted on a horizontal axis, a series of slide-holding devices having a sliding engagement with the periphery of the wheel, and means for securing said slide-holding devices rigidly with respect to the wheel, whereby said slide-holding devices can be adjusted around the periphery of the wheel to accurately balance the same, substantially as described.

2. In an advertising device the herein-described carrier comprising among its members a wheel mounted on a horizontal axis, a series of clips having a sliding engagement with the periphery of the wheel, a slide-holding device carried by each clip and adjustable radially, with respect to said wheel, and means for securing said clips rigidly to said wheel, whereby said wheel can be accurately balanced, according to the number of slides carried thereby, substantially as described.

3. In an advertising device, the combination with the carrier comprising among its members a wheel, a series of slide-holding devices movable around the periphery of said wheel, of an escapement mechanism directly engaging a part connected with said slide-carriers, whereby said wheel can be accurately balanced according to the number of slides carried thereby without interfering with the operation of said escapement, substantially as described.

4. In an advertising device, the herein-described carrier for lantern-slides comprising among its members a series of clips movable around the periphery of the wheel, a radially-adjustable rod secured to each clip, a slide-holder on each of said rods, and securing devices for securing clips rigidly to the wheel, whereby said clips can be moved around said wheel to accurately balance the wheel according to the number of slides carried thereby, substantially as described.

5. In an advertising device, the combination with a lantern, of a wheel having its axis transverse to the line of projection from said lantern, a series of clips engaging the periphery of said wheel, and adjustable around said periphery, a radially-adjustable slide-carrier secured to each of said clips, an escapement engaging projections on each of said clips, means for rotating said wheel and an escapement mechanism for said wheel, directly engaging the projections on said clips, whereby said clips can be moved around the periphery of said wheel to accurately balance the wheel according to the number of slides carried thereby without interfering with the operation of the escapement mechanism, substantially as described.

6. In an advertising device, the combination with a lantern, of a wheel having its axis transverse to the line of projection of the lantern, a series of clips adjustably secured to the periphery of said wheel, a radially-adjustable rod secured to each clip and carrying a slide-holding device at its outer end, means for rotating said wheel, an escapement mechanism for said wheel and a brake engaging said rods having an inclined face retarding face and an angular face to prevent the backward movement of said rod, substantially as described.

WILLIAM JOHN HAWKINS.
REGINALD HARCOURT WRIGHT.

Witnesses:
ERNALD S. MOSELEY,
JOHN W. THOMAS.